United States Patent [19]
Davis

[11] 4,181,208
[45] Jan. 1, 1980

[54] VIBRATION DAMPER WITH THREE SETS OF SPRINGS IN PARALLEL

[75] Inventor: Richard L. Davis, Ann Arbor, Mich.

[73] Assignee: General Motors Corporation, Detroit, Mich.

[21] Appl. No.: 906,961

[22] Filed: May 18, 1978

[51] Int. Cl.$^2$ .............................................. F16D 3/68
[52] U.S. Cl. ................................ 192/106.1; 192/3.29; 64/27 S
[58] Field of Search ..................... 192/106.1, 106.2, 55; 64/27 S

[56] References Cited
U.S. PATENT DOCUMENTS

| | | | |
|---|---|---|---|
| 363,635 | 5/1887 | Henricesen | 192/55 |
| 1,541,411 | 6/1925 | Davis | 192/55 |
| 3,000,198 | 9/1961 | Stout | 64/15 |
| 4,138,003 | 2/1979 | Malloy | 192/106.1 |

Primary Examiner—Benjamin Wyche
Attorney, Agent, or Firm—Donald F. Scherer

[57] ABSTRACT

A vibration damper for a friction clutch having a clutch plate secured to a spring assembly which is comprised of a retainer plate, a hub and three pairs of intertwined springs disposed in parallel resilient drive relation between the plate and hub. Two pairs of the springs are helical torsion springs, and each spring has a driven end and a drive end disposed in notches on the hub and annular slots in the plate, respectively, to permit a predetermined amount of angular movement therebetween while the third pair of springs are spiral springs which are connected at the ends thereof for continuous resilient torque transmission between the plate and hub. All of the springs are fulcrumed near the ends thereof to permit a more even distribution of the internal stresses in the springs during operation.

6 Claims, 5 Drawing Figures

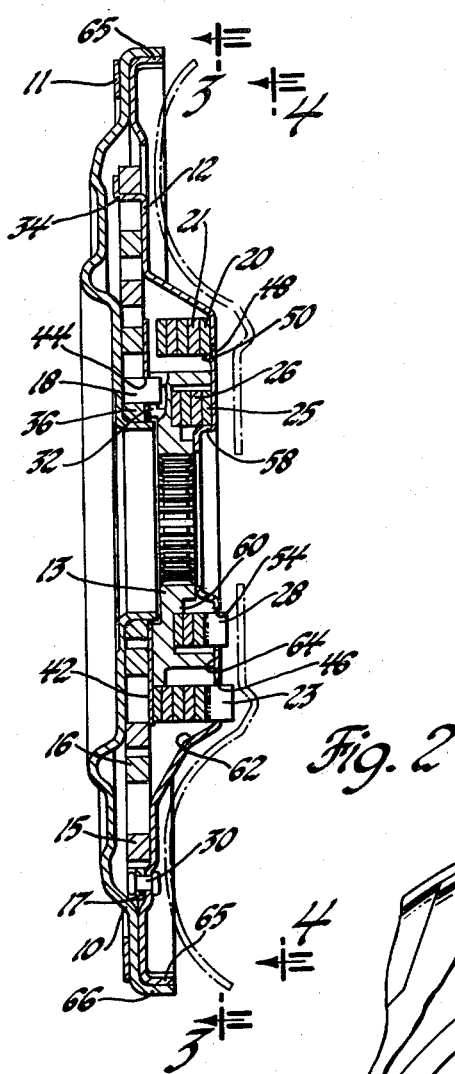
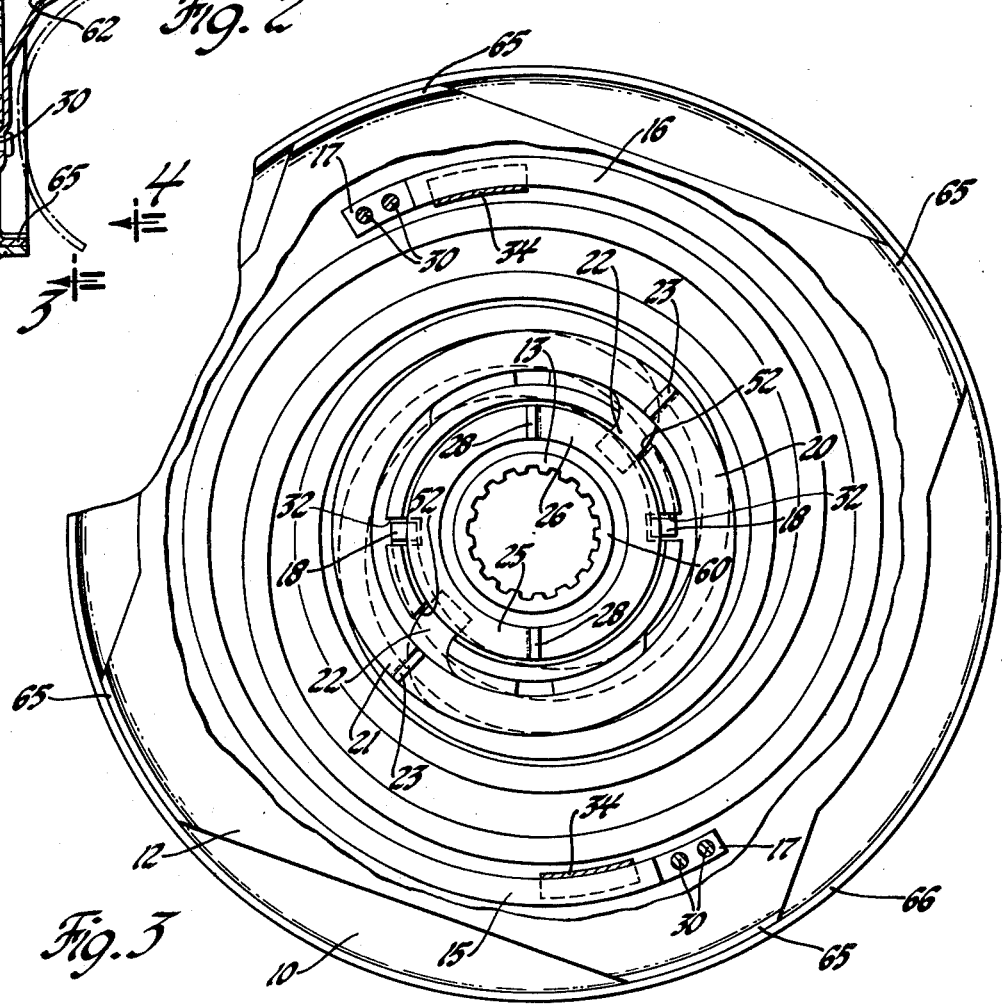

VIBRATION DAMPER WITH THREE SETS OF SPRINGS IN PARALLEL

This invention relates to wide angle vibration dampers and more particularly to wide angle vibration dampers having a plurality of springs in parallel drive relation between the damper drive and driven members.

BACKGROUND OF THE INVENTION

Prior art vibration dampers, which provide a wide angle of travel, utilize serially arranged helical coil compression springs. Examples of such dampers are found in U.S. Pat. Nos. to Libby 2,574,573, issued Nov. 13, 1951, and Stromberg 3,101,600, issued Aug. 27, 1963. These dampers provide approximately twice the angle of travel found in conventional vibration dampers having coil springs disposed in parallel drive arrangements. A conventional parallel damper will provide approximately 18° of travel, therefore the serially arranged dampers will provide approximately 36° of travel.

SUMMARY OF THE INVENTION

The present invention, by utilizing spiral and torsion springs and a lost motion structure, can provide relative motion through angles of approximately 60°. Through the use of intertwined spring pairs having the drive and driven ends displaced by 180°, the loads on the drive and driven members are balanced. Fulcrum structures formed on the drive and driven members support the springs, adjacent the ends thereof, to provide a more even distribution of the stresses in the springs by causing the ends thereof to move in a true arc and the fulcrums also control the number of active turns in the springs. The stress distribution in the springs is further aided by using an integer number of active coils. To facilitate manufacture, the springs, a retainer plate and an output hub are assembled. This assembly can then be secured to the desired clutch plate. In the preferred embodiment, the clutch plate cooperates with the retainer plate in forming an enclosed housing for the springs.

It is therefore an object of this invention to provide an improved vibration damper having a plurality of intertwined spring pairs for permitting a wide angle of relative travel between the drive member and driven member of the vibration damper.

Another object of this invention is to provide an improved wide angle vibration damper wherein a pair of intertwined spiral springs provide the initial drive stage between the drive and driven members, a pair of intertwined helical torsion springs and the spiral springs provide a second drive stage, and another pair of intertwined helical torsion springs and the other two pairs of springs provide a third drive stage.

A further object of this invention is to provide an improved spring subassembly wherein a hub and retainer are drivingly connected by a pair of intertwined spiral springs with each spring having one end secured to the retainer and the other end disposed in peripheral notches on the hub, and two pairs of intertwined helical torsion springs with each spring having one end disposed in arcuate slots on the retainer and the other end disposed in peripheral notches on the hub and wherein each of the springs is fulcrumed on the retainer and hub adjacent the respective ends of the springs.

These and other objects and advantages of the present invention will be more apparent from the following description and drawings in which:

FIG. 2 is a sectional elevational view of the spring assembly and clutch;

FIG. 3 is a view taken along line 3—3 of FIG. 2;

DESCRIPTION OF THE PREFERRED EMBODIMENT

Figure 1:
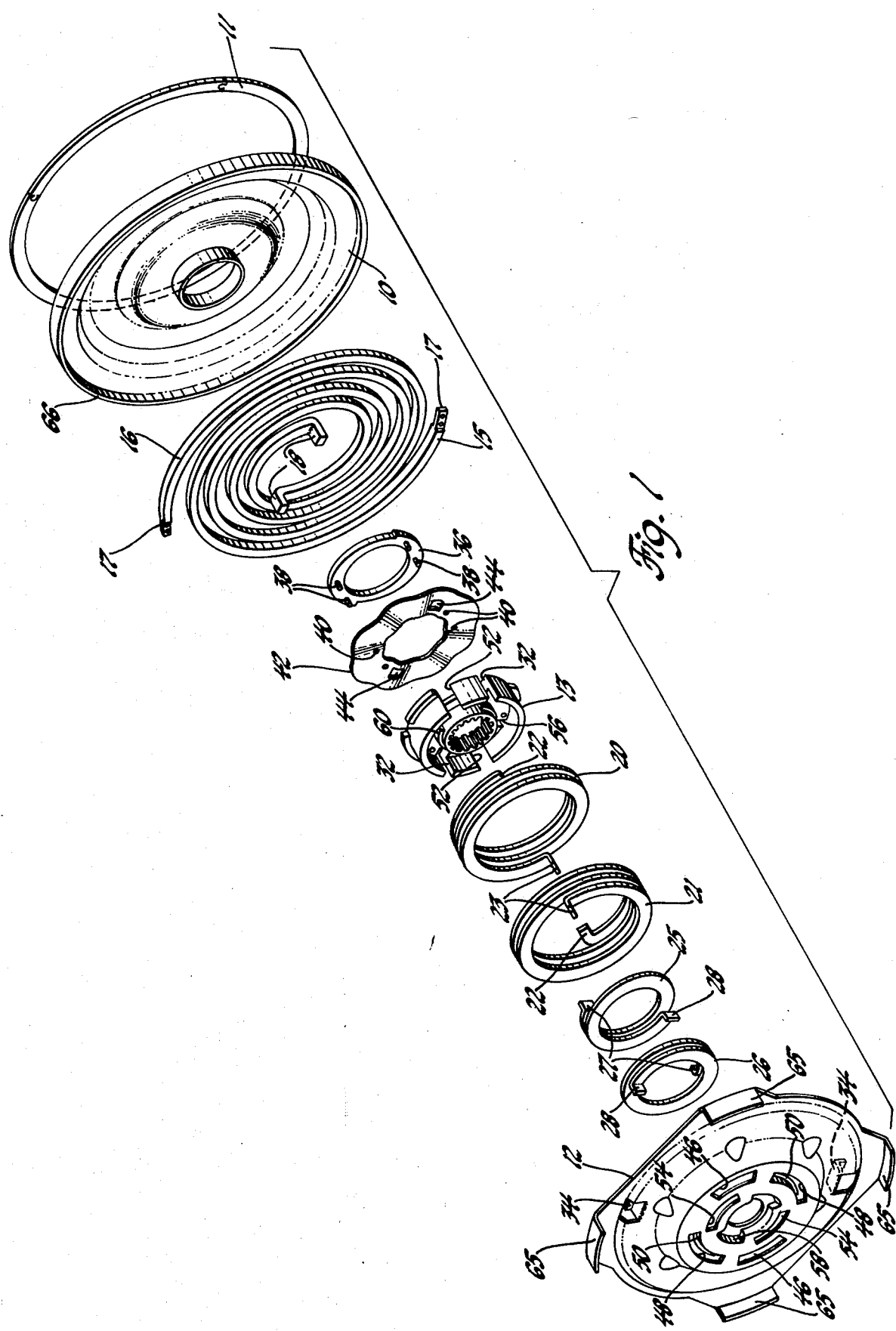
FIG. 1 is an exploded view of the spring assembly and clutch.

Referring to the drawings, wherein like characters represent the same or corresponding parts throughout the several views, there is shown, particularly in FIG. 1, a vibration damper and clutch assembly having a clutch pressure plate 10 to which is bonded a friction surface 11 and a retainer plate 12 which is secured to the clutch pressure plate 10. A hub 13 is disposed between the pressure plate 10 and retainer plate 12. A pair of intertwined spiral springs 15 and 16 are disposed between the retainer plate 12 and the hub 13. The spiral springs 15 and 16 each have an outer end 17 and an inner end 18 which is formed in an axial direction. Also disposed between a retainer plate 12 and hub 13 are a pair of intertwined torsion springs 20 and 21 which have radially extending ends 22 and axially extending ends 23. A third pair of intertwined springs 25 and 26 are also disposed between the retainer plate 12 and the hub 13. The springs 25 and 26 each have axially extending ends 27 and 28.

Figure 4:
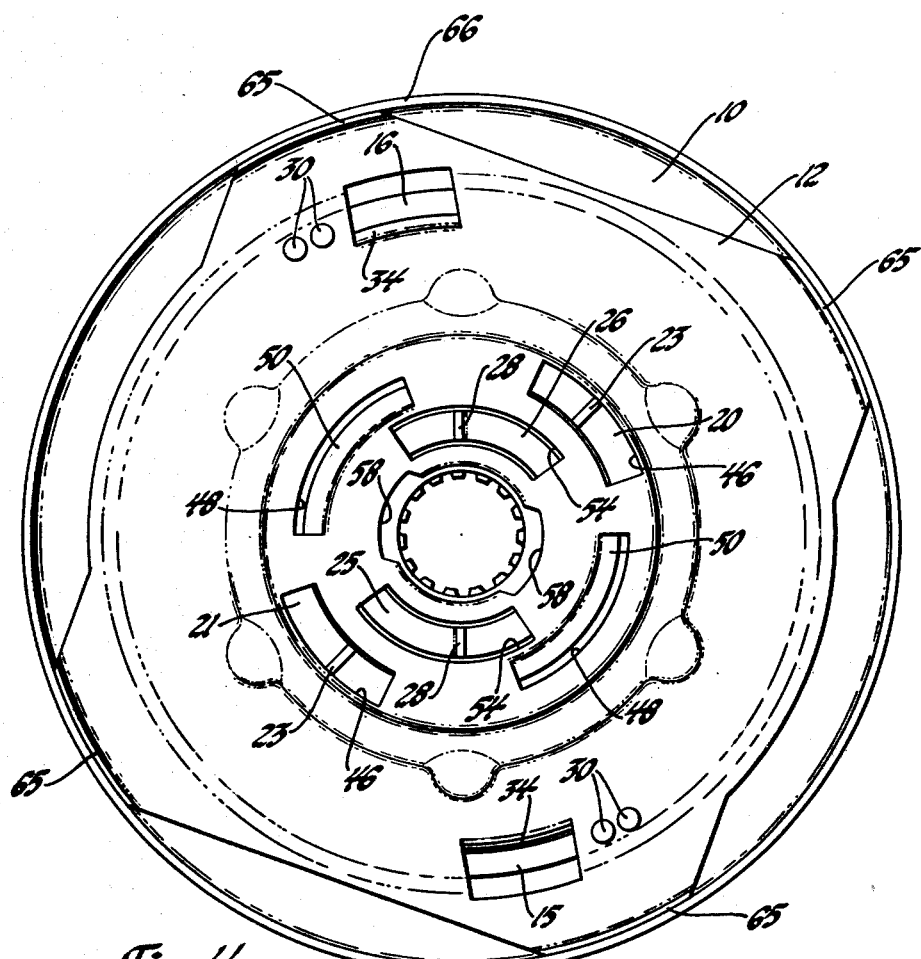
FIG. 4 is a view taken along line 4—4 of FIG. 2.

The spiral springs 15 and 16 each have diametrically located outer ends 17 riveted to the retainer plate 12 at 30 and diametrically located inner ends 18 disposed in peripheral notches 32 formed in the hub 13 at diametrically opposed locations. A pair of fulcrums 34 formed on the retainer plate 12 support the spiral springs 15 and 16 near the connection point 30 on the retainer plate 12. The inner ends 18 of springs 15 and 16 are fulcrumed on a hub 36 which is drivingly connected by four pegs 38 to the output hub 13. The pegs 38 pass through openings 40 formed in a wave spring washer 42. The wave spring washer 42 also has a pair of openings 44 through which the ends 18 of springs 15 and 16 pass to engage in the notches 32. The intertwined springs 20 and 21 have diametrically located axially extending ends 23 disposed in arcuate slots 46 formed in the retainer plate 12. The springs 20 and 21 are fulcrumed by arcuate rims 50 which are formed from the retainer plate 12 by piercing arcuate slots 48 therein. The diametrically located radially facing ends 22 of springs 20 and 21 are disposed in peripheral notches 52 formed at diametrically opposed locations in the output hub 13. As can be seen, the arcuate slots 46 formed in the retainer plate 12 cover a wide angle of opening such that the axially facing ends 23, as seen in FIG. 4, are not rigidly or continuously connected to the retainer plate 12. The springs 20 and 21 are fulcrumed, on the outer surface of hub 13, near the radially inwardly facing ends 22. The helical torsion springs 25 and 26 have diametrically located axially facing ends 28 disposed in arcuate slots 54 formed in the retainer plate 12, while the diametrically located axially facing ends 27 are disposed in peripheral notches 56 formed in the hub 13. It will again be noted that the arcuate slots 54 have a wide angular opening so that the ends 28, as seen in FIG. 4, are not rigidly or continuously connected to the retainer plate 12 but will permit some relative movement therebetween. The arcuate slots 54 have a wider angular opening than arcuate slots 46. The springs 25 and 26 are fulcrumed on a hub portion 58 formed in the retainer plate 12 by the displacement of material. The springs 25 and 26 are also fulcrumed adjacent the axially facing ends 27 on a cylindrical portion 60 formed on the output hub 13.

The retainer plate 12 has a cup-shaped inner portion 62 in which is located the torsion springs 20 and 21, 25 and 26 and the output hub 13. As can best be seen in FIG. 2, the wave spring washer 42, disposed between the hub 13 and hub 36, provides axial forces thereon which urges the hub 13 against the retainer plate 12 at location 64 while the hub 36 is urged against the clutch pressure plate 10. The contact between the retainer plate 12 and hub 13 and the hub 36 and clutch plate 10 provide the friction surfaces which are required for effective vibration dampening and energy absorption when relative angular movement occurs therebetween. The wave spring washer 42 therefore controls the axial force in both directions so that only a single spring member is needed to provide the friction damping, or energy absorption, which is required. The retainer plate 12 has four flanges 65 formed on the outer periphery thereof, which flanges 65 are inserted within a flanged rim 66 of the clutch plate 10. The retainer plate 12 and clutch plate 10 are secured together by welding at these four locations.

The springs 15, 16, 20, 21, 25 and 26, retainer plate 12 and output hub 13 can be assembled into a separate subassembly for storage and handling prior to being secured to the clutch plate 10. For this reason the clutch plate 10 can be of any of the conventionally designed clutch plates or it can be the single plate type shown in the drawings. The clutch plate shown in the drawings is particularly adapted for use as a lock-up clutch in the torque converter wherein the clutch is disposed intermediate the turbine member and input shell within a conventional torque converter, such as shown in U.S. Pat. No. 3,252,352 to General et al, issued May 24, 1966. As is well known with torque converter lock-up clutches, the clutch is engaged by fluid pressure acting on the pressure plate between the pressure plate and the turbine to urge the friction surface of the clutch into engagement with the input shell of the torque converter thereby providing a positive friction drive connection between the engine and the gearing of the transmission such that the torque converter is effectively bypassed. The damper isolates the engine torsional vibrations from the transmission gearing so that the vibrations are not felt in the drive path downstream of the torque converter.

Figure 5:
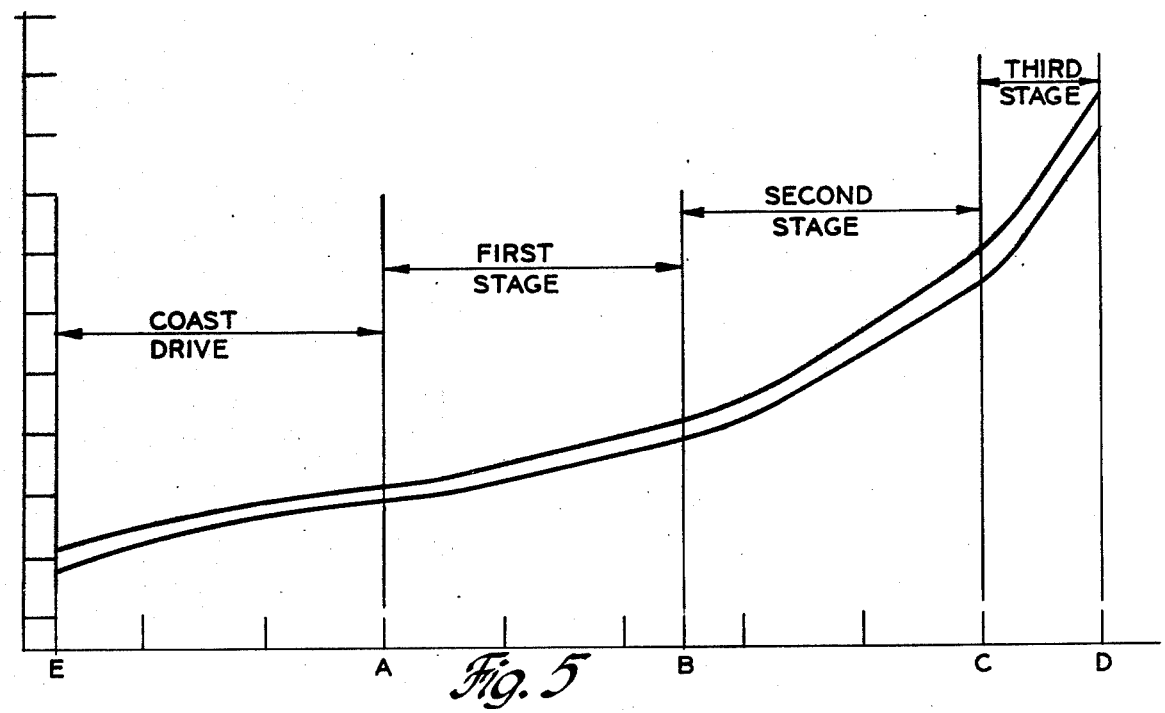
FIG. 5 is a curve showing the damping rate.

In the present invention, the damper provides a multi-stage damping effect, as seen in FIG. 5, such that during the initial phase of damping, between points A and B, the spiral springs 15 and 16 are the only effective resilient drive through the damper. This is possible because of the pairs of slots 46 and 54 formed in the retainer plate 12. The ends 23 of springs 20 and 21 are positioned in slots 46 such that after approximately 25°, point B, of relative angular movement between the clutch plate 12 and hub 13, the ends 23 will contact the ends of slots 46; thus the springs 20 and 21 become effective as a resilient drive connection in parallel with the spiral springs 15 and 16 during the second stage of damping from point B to point C. The second stage of damping occurs for approximately 25° until the ends 28 of springs 25 and 26 contact the slots 54 at which time all three sets of springs become effective in parallel drive relation as a resilient drive connection in the damper during the third stage of damping, from point C to point D. The damper is a wide angle damper which will permit relative angular movement between the damper input and output of approximately 60° of overall travel. The utilization of the multiple stage damping permits the damper rate to be more closely controlled to effectively provide the desired damping rate for the various torque levels which will occur within the engine output. At very low engine torques, the relative angular movement and damping required are undertaken by the spiral springs 15 and 16 and the friction surfaces alone. This permits a very low spring rate which is desirable during this portion of the damping action. In the intermediate torque ranges, the combination of springs 15, 16 and 20, 21 and the friction surfaces permit a higher damping rate which is desired in the intermediate range, while the combination of all three pairs of springs and the friction surfaces permit a high damping rate at the high torque output region of the engine. It can also be seen in FIG. 5, that during "coast drive" the damper spiral springs are effective from point A to point E.

The use of fulcrums near the ends of the springs permits an accurate control of the number of active turns within the spring and also improves the distribution of the internal stresses which occur in springs of these types. The spiral springs 15 and 16 are active, in the preferred embodiment, for 60° of deflection. It should be noted that these springs are not true Archimedean spirals, but are designed to give the maximum amount of deflection in a minimum space by integrating around the coil and matching deflection points with the appropriate coil spacing. As previously mentioned, the stress concentrations are controlled to a minimum in that the springs have an integer number of active turns. By riveting the outer ends to the retainer plate and use of the supporting fulcrums at the inner and outer ends, the spiral springs are controlled on their fulcrums so that the ends of the springs will move in a true arc. The helical torsional springs are also designed to have an integer number of active coils and the use of fulcrums at the ends thereof control the stress concentrations to a minimum in these springs also. As previously mentioned, the helical torsional springs are fixed at the hub end thereof and are free at the retainer end.

The use of the parallel springs as previously mentioned, permits a damping curve, as shown in FIG. 5, of a variable rate which combine with the friction components to allow for good control of both low frequency and high frequency vibrations in the drive line. It should also be noted that the intertwined spring sets have their ends displaced 180° apart which permits the balancing of loads on the hub 13 and retainer plate 12. The stress concentrations as previously mentioned are held to a minimum with as few turns as possible within the springs, and the nesting of the spiral springs permit the maximum wire length to be used in the spring set without the coils closing down and touching during operation. The intertwining of the torsional spring permits compactness in the clutch damper and therefore improvement in package size.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A friction clutch and torsional vibration damper comprising; a clutch plate having a friction element secured thereto; a spring retainer plate secured to said clutch plate and cooperating therewith to form a spring housing; an output hub mounted in said spring housing for angular movement relative to said clutch plate; first stage spring means in said spring housing for providing a resilient drive between said clutch plate and said output hub during a first predetermined amount of relative angular movement including a pair of spiral springs each having an outer end secured to said spring retainer plate at diametrically opposed locations and an inner end drivingly connected to said output hub at diametrically opposed locations; second stage spring means in said spring housing cooperating with said first stage spring means for providing a resilient drive between said clutch plate and said output hub during a second predetermined amount of relative angular movement having a pair of torsion springs each having a drive end drivingly connected to said output hub and a driven end operative to be driven by said spring retainer plate after the first predetermined amount of relative angular movement between said clutch plate and said output hub; and third stage spring means in said spring housing cooperating with said first and second stage spring means for providing further relative movement between said clutch plate and said output hub including a pair of torsion springs each having a drive end drivingly connected to said output hub and a driven end operative to be driven by said spring retainer plate after the second predetermined amount of relative angular movement between said clutch plate and said output hub.

2. A spring subassembly for a torsional vibration damper comprising, a hub having three circumferentially spaced sets of diametrically opposed peripheral notches, a retainer having a shallow cup-shaped portion and a flanged rim, said cup-shaped retainer portion having two sets of radially spaced slots, each set comprising a pair of diametrically opposed arcuate slots, and three parallel connected sets of springs assembled between said retainer and said hub comprising a first pair of intertwined helical torsion springs having pairs of axially extending ends respectively disposed in one set of retainer slots and one set of hub notches and fulcrumed on said retainer and said hub, a second pair of intertwined helical torsion springs each having an axially extending end and a radially extending end respectively disposed in another set of retainer slots and another set of hub notches, and fulcrumed on said retainer and said hub, and a pair of intertwined spiral springs, each spiral spring having an inner axially extending end disposed in the third set of hub notches and fulcrumed on said hub and an outer end attached to said retainer and fulcrumed thereon.

3. A friction clutch and torsional vibration damper comprising; a clutch plate having a friction element secured thereto; a spring retainer plate secured to said clutch plate and cooperating therewith to form a spring housing; an output hub mounted in said spring housing for angular movement relative to said clutch plate; first stage spring means in said spring housing including a pair of spiral springs each having an outer end secured to said spring retainer plate at diametrically opposed locations and an inner end drivingly connected to said output hub at diametrically opposed locations; second stage spring means in said spring housing having a pair of intertwined torsion springs each having a drive end drivingly connected to said output hub at diametrically opposed locations and a driven end operative to be driven by said spring retainer plate at diametrically opposed locations after a first predetermined amount of relative angular movement between said clutch plate and said output hub; and third stage spring means in said spring housing including a pair of intertwined torsion springs each having a drive end drivingly connected at diametrically opposed locations to said output hub and a driven end operative to be driven at diametrically opposed locations by said spring retainer plate after a second predetermined amount of relative angular movement between said clutch plate and said output hub.

4. A clutch damper comprising; a clutch plate; and a spring subassembly comprising; a hub having three circumferentially spaced sets of diametrically opposed peripheral notches; a retainer having a shallow cup-shaped portion and a flanged rim, said cup-shaped portion having two sets of radially spaced slots, each set comprising a pair of diametrically opposed arcuate slots; and three parallel connected sets of springs assembled between said retainer and said hub comprising a first pair of intertwined helical torsion springs having pairs of axially extending ends respectively disposed in one set of retainer slots and one set of hub notches and fulcrumed on said retainer and said hub, a second pair of intertwined helical torsion springs each having an axially extending end and a radially extending end respectively disposed in another set of said retainer slots and another set of said hub notches, and fulcrumed on said retainer and said hub, and a pair of intertwined spiral springs, each spiral spring having an inner axially extending end disposed in the third set of hub notches and fulcrumed on said hub and an outer end attached to said retainer and fulcrumed thereon, said spring subassembly being secured to said clutch plate at the flanged rim of said retainer.

5. A clutch assembly comprising; a clutch plate having a flanged outer rim; a spring subassembly for providing a torsional vibration damper comprising, a two piece hub, one hub piece having three circumferentially spaced sets of diametrically opposed peripheral notches, a retainer having a shallow cup-shaped portion and a flanged rim disposed in and secured to the flanged outer rim of the clutch plate, said cup-shaped retainer portion having two sets of radially spaced slots, each set comprising a pair of diametrically opposed arcuate slots, and three parallel connected sets of springs assembled between said retainer and said hub comprising a first pair of intertwined helical torsion springs having pairs of axially extending ends respectively disposed in one set of retainer slots and one set of hub notches and fulcrumed on said retainer and said hub, a second pair of intertwined helical torsion springs each having an axially extending end and a radially extending end respectively disposed in another set of retainer slots and another set of hub notches, and fulcrumed on said retainer and said hub, and a pair of intertwined spiral springs, each spiral spring having an inner axially extending end disposed in the third set of hub notches and fulcrumed on said hub and an outer end attached to said retainer and fulcrumed thereon; and a wave spring disposed between said two hub pieces for urging said hub pieces in opposite axial directions and into friction damping abutment with said clutch plate and said retainer.

6. A friction clutch and torsional vibration damper comprising; a clutch plate having a friction element secured thereto; a spring retainer plate secured to said clutch plate and cooperating therewith to form a spring housing; an output hub having a plurality of sets of diametrically opposed notches, said output hub being mounted in said spring housing for angular movement relative to said clutch plate; first stage spring means in said spring housing including a pair of spiral springs each having an outer end secured to said spring retainer plate at diametrically opposed locations and an inner end drivingly connected to said output hub in one set of said diametrically opposed notches; second stage spring means in said spring housing including a pair of intertwined torsion springs each having a drive end drivingly connected to said output hub in a second set of said diametrically opposed notches and a driven end operative to be driven by said spring retainer plate at diametrically opposed locations after a first predetermined amount of relative angular movement between said clutch plate and said output hub; and third stage spring means in said spring housing including a pair of intertwined torsion springs each having a drive end drivingly connected in a third set of said diametrically opposed notches in said output hub and a driven end operative to be driven at diametrically opposed locations by said spring retainer plate after a second predetermined amount of relative angular movement between said clutch plate and said output hub.

* * * * *